United States Patent [19]

Koo et al.

[11] Patent Number: 4,881,813

[45] Date of Patent: Nov. 21, 1989

[54] PASSIVE STABILIZATION OF A FIBER OPTIC NONLINEAR INTERFEROMETRIC SENSOR

[75] Inventors: Kee P. Koo, Alexandria, Va.; Frank Bucholtz, Crofton, Md.; Anthony Dandridge, Alexandria, Va.

[73] Assignee: The United States of America as represented by the Secretary of the Navy, Washington, D.C.

[21] Appl. No.: 196,705

[22] Filed: May 20, 1988

[51] Int. Cl.⁴ .................................................. G01B 9/02
[52] U.S. Cl. .................................... 356/345; 324/244; 250/227
[58] Field of Search .......................... 356/345; 250/227; 324/244

[56] References Cited

U.S. PATENT DOCUMENTS

| | | | |
|---|---|---|---|
| 0,000,H94 | 7/1986 | Koo | 250/227 |
| 4,591,786 | 5/1986 | Koo et al. | 324/244 |
| 4,600,885 | 7/1986 | Koo et al. | 324/244 |
| 4,603,296 | 7/1986 | Koo et al. | 324/244 |

OTHER PUBLICATIONS

Jackson et al., *Applied Optics*, vol. 19, No. 17, pp. 2926-2929, 9/80.
Koo et al., *Appl. Phys. Lett.*, vol. 41, No. 7, pp. 616-618, 10/82.
Koo et al, *IEEE Trans on Magnetics*, vol. MAG-22, No. 3, pp. 141-144, 5/86.
Koo et al, *Optics Letters*, vol. 12, pp. 440-442, 6/87.
Koo et al., *Optics Letters*, vol. 11, pp. 683-685, 10/86.
Koo et al., *J. Light Wave Tech.*, vol. LJ-5, No. 12, pp. 1680-1685, 12/87.

*Primary Examiner*—Davis L. Willis
*Assistant Examiner*—Matthew W. Koren
*Attorney, Agent, or Firm*—Thomas E. McDonnell; George Jameson

[57] ABSTRACT

Three sampling circuits, a subtraction circuit, and a divider circuit cooperate to sample an output signal from a nonlinear interferometric sensor at proper times, to subtract output signal samples to obtain a difference signal, and to divide an output signal sample into the difference signal to remove noise-induced modulation from the output signal.

17 Claims, 2 Drawing Sheets

PASSIVE STABILIZATION OF A FIBER OPTIC NONLINEAR INTERFEROMETRIC SENSOR

BACKGROUND OF THE INVENTION

This invention relates to a passive stabilization system using synchronous sampling for stabilizing nonlinear interferometric sensors. The invention relates in particular to passive stabilization of a nonlinear fiber optic interferometric sensors via a system.

DESCRIPTION OF THE PRIOR ART

In order to use an optical fiber interferometer to detect a signal field (e.g. acoustic, magnetic, rotation etc.), the interferometer output signal needs to be stabilized against environmental perturbations such as air currents and temperature fluctuations.

Accordingly to the prior art, one can use an active stabilization scheme or a passive stabilization scheme to stablize the interferometer output signal. One active scheme uses a feedback phase tracker, which is usually a piezoelectric (PZT) element, to keep the interferometer in its linear response region. This active scheme is shown in a paper by D. A. Jackson, R. Priest, A. Dandridge and A. D. Tvetan, "Elimination of drift in a single-mode optical fiber interferometer", Appl. Opt. 19, pp. 2926–2928 (1980).

One passive scheme to stabilize the interferometer output signal uses a 3×3 fiber coupler to generate two interferometer output signals which are $\pi/2$ radians (90 degrees) out-of-phase with each other so that post-detection signal processing (the differential cross multiplication technique) can be used to extract the desired signal from a free-running interferometer. The passive scheme is illustrated by a paper by K. P. Koo, A. B. Tveten and A. Dandridge titled "Passive stabilization scheme for fiber interferometer using (3×3) fiber directional coupler", Appl. Phy Lett, Vol. 4, pages 616–618, 1982.

The passive scheme is advantageous because it is able to obviate the bulky PZT element used in the active scheme, thus providing an all-optical sensor design which is not susceptible to electromagnetic interference and is free of noise resulting from resetting the PZT. The passive scheme, however, requires an expensive, not readily available, special optical component, namely, a 3×3 fiber coupler.

An object of the invention is to sample and normalize the output of a nonlinear interferometric sensor to obtain a passively stabilized output signal.

Another object of the invention is to provide a nonlinear interferometric sensor containing a nonlinear transducer as the sensing element, to sample and subtract two samples of the sensor output, and to divide the result by another sample of the sensor output in order to normalize and stabilize the sensor output. These steps (samplings) counteract the effect of environmental perturbations sensed at the same time a measurand field signal is sensed by the sensing element.

Still another object of the invention is to provide a system in which a sensor output signal is sampled and processed to remove noise-induced modulation from an output signal derived from a phase modulated radiation signal developed by a fiber optic interferometric sensor.

Other objects, features and advantages of the invention will be apparent to those skilled in the art in the description of the preferred embodiment of the invention as described below and also recited in the appended claims.

SUMMARY OF THE INVENTION

The above and other objects of this invention are met by a nonlinear interferometric sensor having means to sample a spuriously-modulated signal outputted by a nonlinear interferometric sensor, to subtract samples of the signal, and to divide another sample of the signal into a difference signal resulting from the subtraction of the other samples to remove spurious modulation from the outputted signal, and thus obtain a passively stabilized signal from the sensor.

Gated integrators to sample the spuriously modulated signal from a nonlinear interferometric sensor, using a divider amplifier to obtain a difference signal from samples of the signal, and a divider amplifier are used to obtain a passively stabilized signal by dividing a sample of the signal from the sensor into the difference signal.

The above and oher objects of the invention are met by a system, and a method performed by the system, wherein three separate signal sampling means, a signal subtraction means, and a signal divider means are employed in a circuit connected to a nonlinear interferometric sensor. Three samples are taken at proper times during oscillations of a drive signal from a drive signal source. Samples taken when the drive signal is at a peak and when the drive signal is at a valley are subtracted for each other to obtain a difference signal. Then, a sample taken when the drive signal is at a midpoint between a peak and a valley of an oscillation is divided into the difference signal. The result is an intended signal. This intended signal is a passively stabilized nonlinear interferometric sensor output signal, as explained in this specification.

DESCRIPTION OF THE PREFERRED EMBODIMENT

The invention provides sampling means together with subtraction and divider means to sample an output signal from a nonlinear interferometric sensor with a nonlinear sensing transducer and to cancel noise-induced modulation from the output signal to obtain a passively stabilized output signal from a sensor system operable in a measurand field while noise perturbations introduce the noise-induced modulation.

In accordance with the invention, the sampling means together with the difference and divider means combine with the nonlinear fiber optic interferometric sensor to remove spurious modulation from the sensor output signal. Adjustment of the drive signal amplitude applied to the sensor can result in full cancellation of the spurious modulation. The drive signal triggers the sampling means at selected times in the drive signal oscillations to obtain the desired results. The difference and divider circuits together remove spurious modulation from the sampled sensor output signal with the result that the signal provides an accurate measurement of a field signal processed by the sensor and passively stabilized by the sampling, differencing, and dividing circuits.

In the preferred embodiment of the invention, the nonlinear sensor system is comprised of a nonlinear fiber optic interferometric sensor having two arms including a sensing arm having a nonlinear transducer, a periodic drive signal source used to drive the transducer, three sampling circuits for taking the sensor output signal at three separate times during a drive signal oscillation in which the drive signal first passes through a peak, then through a midpoint, and then through a valley, a subtraction circuit for subtracting the signal taken at the time when the drive signal is at the valley from the sample taken at the time when the drive signal is at the peak, and a divider circuit for dividing the signal sample taken when the drive signal is at the midpoint into the output of the subtraction circuit. Use of the preferred embodiment of the invention results in a passively stabilized sensor output signal that does not contain any noise-induced modulation even though the signal originally did contain noise-induced modulation.

Figure 1:
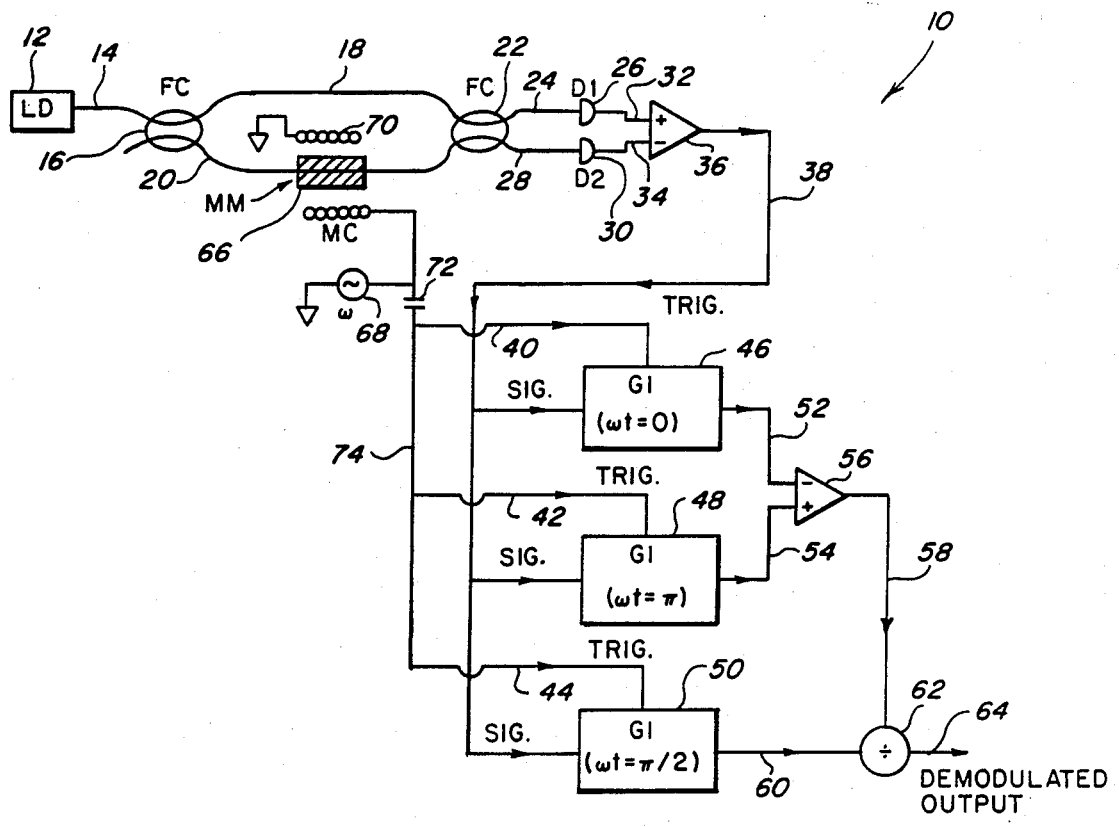
FIG. 1 shows a schematic diagram of an exemplary fiber optic interferometric nonlinear sensor system that produces a passively stabilized output signal.

A preferred embodiment of the invention is shown diagrammatically in FIG. 1. FIG. 1 shows a system 10 comprised of a fiber-optic magnetometer and signal processing electronics for the passive sampling demodulation scheme made available by the invention.

System 10 includes a coherent radiation source 12 which is, but need not be, a laser diode LD. A length of optical fiber 14 carries coherant radiation from source 12 to a 2×2 fiber coupler 16. Coupler 16 has two input ports and two output ports. Fiber 14 directs radiation into one of the two input ports, as shown. The radiation entering coupler 16 through the one input port is split into two parts by coupler 16, with the result that part of the radiation reaches one output port and another part of the radiation reaches another output port.

Two interferometer arms 18 and 20 made of optical fiber material are connected between fiber coupler 16 and another optical fiber coupler 22. Arm 18 is a reference arm. Arm 20 is a sensing arm. These arms 18, 20 are employed in a Mach-Zehnder interferometer configuration. Arm 18 runs from one output port of coupler 16 to one input port of coupler 22. Arm 20 runs from another output port of coupler 16 to another input port of coupler 22. Coupler 22 has two output ports. Both couplers 18, 22 are single-mode couplers. Multi-mode couplers can not be used for interferometric devices.

Radiation reaching output ports of coupler 16 travels into arms 18 and 20 and travels through these arms into the input ports of coupler 22. Coupler 22 directs radiation in a known manner to the coupler's output ports where the radiation is outputted from the coupler.

A length of optical fiber 24 carries radiation from one output port of coupler 22 to a radiation detector 26 (labelled D1). A length of optical fiber 28 carries radiation from another output port of coupler 22 to another radiation detector 30 (labelled D2). Each detector 26 and 30 is a nonlinear detector having quadratic response to incident radiation. Detectors 26 and 30 are matching detectors.

An electrical conductor 32 carries an electrical output signal from detector 26 to an input of a differential amplifier 36. Another length of electrical conductor 34 carries an electrical output signal from detector 30 to another input of the same differential amplifier 36. This differential amplifier 36, produces an output signal (SIG.) which is applied by way of an electrical conductor 38 to three sampling means or gated integrators (GI) 46, 48 and 50. Hence, any signal on conductor 38 is simultaneously applied to the sampling means 46, 48 and 50 for sampling purposes. (Signal sampling performed sequentially also works, but is not illustrated).

Conductor 52 connects the output of sampling means 46 to an input of a two-input differential amplifier 56. Conductor 54 connects the output of the sampling means 48 to an input of the same differential amplifier 56. This differential amplifier, 56, produces an output applied to an electrical conductor 58.

A conductor 60 connects the output of the sampling means 50 to an input of a divider amplifier 62. Conductor 58 applies an output signal from amplifier 56 to an input of divider amplifier 62. Amplifier 62 provides an output applied to a conductor 64.

A magnetostrictive element 66 (labelled MM) integral with sensing arm 20 acts as a nonlinear transducer that responds to magnetic fields by changing its length with a quadratic dependence. Such an element usually manifests an increase in length with an increase in field strength. However, a magnetic element may manifest a decrease in length with an increase in field strength. Since the former type of element is more common than the latter kind, it is preferred to employ the former, but the latter could be employed with equal success.

Element 66 is, in effect, a magnetostrictive sensor (MM) because optical fiber of sensing arm 20 is tightly wound about element 66 in such a way that any change in length of element 66 is directly converted into a proportionate change in length of sensing arm 20. The latter change brings about a change in the phase of radiation reaching coupler 22 after traveling from coupler 16 through arm 20. This phase change when compared with zero phase change in the radiation traveling from coupler 16 through reference arm 18 to coupler 22 is an indicia of the strength of the magnetic field acting on element 66.

A sine wave generator source 68 energizes an electromagnetic coil 70 in a closed circuit loop established via ground between source 68 and coil 70. A sinusoidal drive signal from source 68 excites magnetostrictive element 66 with a sinusoidal magnetic field generated by coil 70.

A D.C. blocking capacitor 72 serially connected to a conductor 74 allows A.C. signal current from source 68 to flow over conductor 74. Three branch conductors 40, 42 and 44, connected to conductor 74, carry A.C. signals from source 68 to sampling circuits 46, 48, and 50. These signals serve as trigger signals (TRIG) that activate the sampling means 46, 48 and 50 to respectively sample the signal on the conductor 38 at proper times during each sine wave produced by source 68.

Information relevant to the subject matter of this specification is set forth in a paper by K. P. Koo, F. Bucholtz, and A. Dandridge titled "Passive stabilization of a fiber-optic nonlinear sensor by using a sampling scheme", published in Optics Letters, Vol. 12, pp. 440-442, June 1987. This paper is hereby incorporated herein by reference.

SYSTEM OPERATION

The working principle of sampling demodulation performed by system 10 can be explained by the following analysis using the fiber magnetometer response for illustration. Consider an interferometer output intensity $$I_o = I_i(1 + \rho \cos \phi)/2 \qquad (1)$$

where $I_i$ is the input intensity, $\rho$ is the interferometer fringe visibility and $\phi$ is the phase shift in the interferometer. When the interferometer is subjected to both magnetic and other perturbations, the total phase is equal to the summation of all the individual phase shifts corresponding to different types of perturbations. The magnetic phase signal due to a magnetic field H on magnetostrictive element 64 is $$\phi_m = klCH^2 \qquad (2)$$

where $k = (2\pi/\lambda)n \{(1 - n^2/2[P_{12}(1-\mu) - P_{11}\mu]\}$ is the modified propagation constant of the light beam. $P_{11}$, $P_{12}$ are the elasto-optic constants of the fiber core, $\mu$ is the Poisson's ratio of the fiber core, n is the refractive index of glass. l is the sensor length, and C is the magnetostrictive constant. If the total magnetic field consists of a DC component $H_{DC}$ and an AC component h cos at frequency, then $$\phi_m = klC\left(H_{dc}^2 + \frac{h^2}{2}\right) + 2\,klCH_{dc}\,h\cos\omega t + \tfrac{1}{2}\,klCh^2\cos 2\omega t \qquad (3)$$

The phase shift due to nonmagnetic perturbations is $\phi_o$. For simplicity of analysis, assume the frequency components of $\phi_o$ are well below $\omega$. Now the total interferometr phase shift can be written as $$\begin{aligned}
\phi &= \phi_o + \phi_m \\
&= \phi_1 + \phi_2 + \phi_3
\end{aligned} \qquad (4)$$

where $$\begin{aligned}
\phi_1 &= \phi_o + klC\left(H_{DC}^2 + \frac{h^2}{2}\right) = (DC\ components) \\
\phi_2 &= A_1 \cos \omega t = (\text{component at } \omega) \\
\phi_3 &= A_2 \cos 2\omega t = (\text{component at } 2\omega) \\
A_1 &= 2klCH_{DC}h \\
A_2 &= (klCh^2)/2
\end{aligned}$$

Substituting $\phi = \phi_1 + \phi_2 + \phi_3$ into eq. 1, one obtains $$\frac{I_o}{I_i} = \tfrac{1}{2} + \frac{\rho}{2}\{\cos(\phi_1+\phi_3)\cos\phi_2 - \sin(\phi_1+\phi_3)\sin\phi_2\}$$

Note that $\phi_2$ contains the desired signal $H_{DC}$, $\phi_1$ contains the non-magnetic signal $\phi_0$ and $\phi_3$ is a well defined signal with fixed amplitudes and frequency. Now, if one samples $I_o/I_i$ at $\omega_m t = 0, \pi$ and $\pi/2$ independently, one can obtain sampled signals:

$$\frac{I_o}{I_i}(\omega t = 0) = \tfrac{1}{2} + \frac{\rho}{2}[\cos(\phi_1 + A_2) \times \qquad (6)$$
$$\cos A_1 - \sin(\phi_1 + A_2)\sin A_1]$$

$$\frac{I_o}{I_i}(\omega t = \pi) = \tfrac{1}{2} + \frac{\rho}{2}[\cos(\phi_1 + A_2) \times \qquad (7)$$
$$\cos A_1 + \sin(\phi_1 + A_2)\sin A_1]$$

-continued $$\frac{I_o}{I_i}(\omega t = \pi/2) = \tfrac{1}{2} + \frac{\rho}{2}[\cos(\phi_1 - A_2)] \qquad (8)$$

Subtracting (6) and (7), the differential output is $$\frac{I_o}{I_i}(\omega t = \pi) - \frac{I_o}{I_i}(\omega t = 0) = \rho\sin(\phi_1 + A_2)\sin A_1 \qquad (9)$$

Note that the sampled output at $\omega t = \pi/2$ (Eq. 8) can be electronically offset such that $$\frac{I_o}{I_i}\left(\omega t = \frac{\pi}{2}\right) - \tfrac{1}{2} = \frac{\rho}{2}[\cos(\phi_1 - A_2)] \qquad (10)$$

Furthermore, dividing eq. 9 by eq. 10, one obtains a normalized output $$F = \frac{\dfrac{I_o}{I_i}(\omega t = \pi) - \dfrac{I_o}{I_i}(\omega t = 0)}{\dfrac{I_o}{I_i}\left(\omega t = \dfrac{\pi}{2}\right) - \tfrac{1}{2}} \qquad (11)$$

$$= \frac{2\sin(\phi_1 + A_2)}{\cos(\phi_1 - A_2)}\sin A_1$$

If one sets $A_2 = klCh^2/2 = (N + \tfrac{1}{4})\pi$ for integer N by choosing the dither magnetic field amplitude $h = \sqrt{(4N+1)\pi/(2kCl)}$, eq. 11 becomes $$F = \frac{2\sin(\phi_1 + \pi/4)}{\cos(\phi_1 - \pi/4)}\sin A_1, \text{ for } N = 1$$

Since $\sin(\phi_1 + \pi/4) = \cos(\phi_1 - \pi/4)$, $$\begin{aligned}
F &= 2\sin A_1 \\
&= 2\sin(2klCH_{DC}h) \\
&= 4\,kClH_{DC}h \text{ for } H_{DC} \to 0
\end{aligned} \qquad (12)$$

Therefore, this normalized signal F is directly proportional to the DC magnetic field $H_{DC}$ (the test signal) when the fiber magnetometer is operated in the closed magnetic loop configuration (5) (i.e. for $H_{DC} \to 0$).

EXAMPLE

Figure 2:
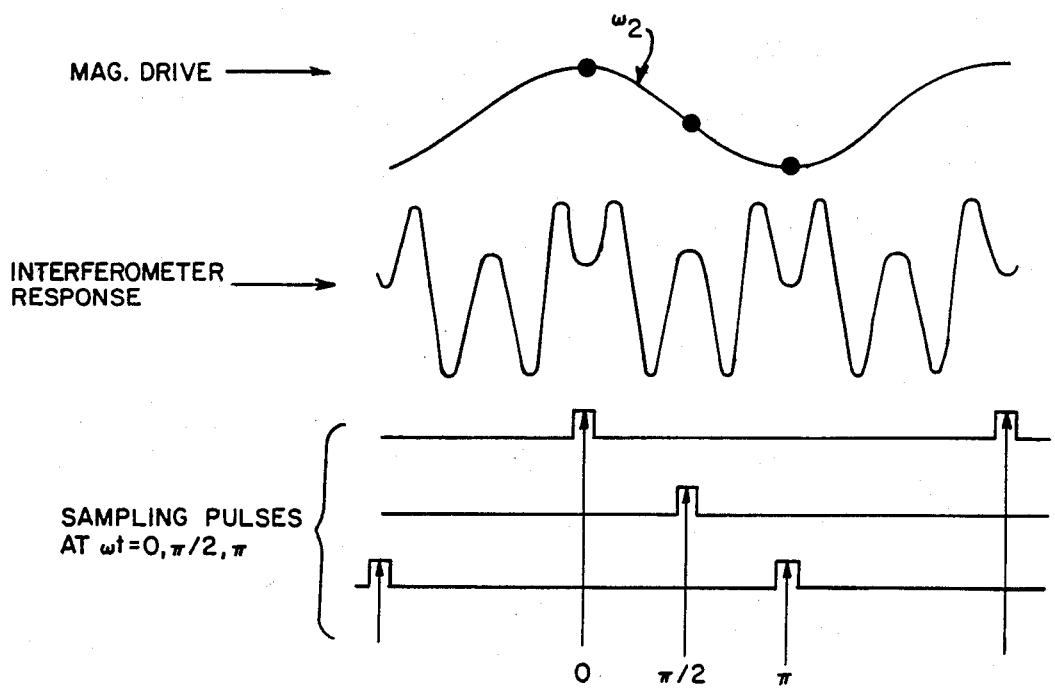
FIG. 2 shows signals taken from an oscillogram, illustrating the setting of the sampling pulses relative to ac magnetic bias (MAG. DRIVE) applied to the interferometric nonlinear sensor of FIG. 1 and relative to an interferometer output.
Figure 3A:
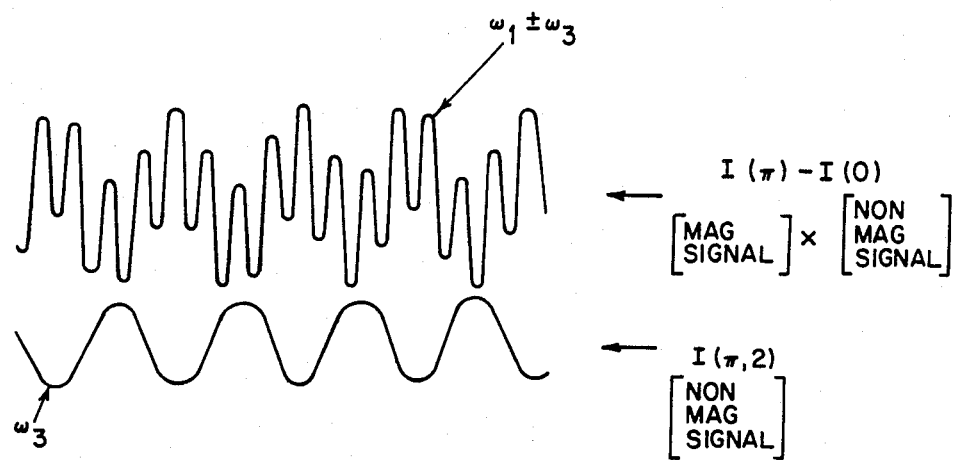
FIGS. 3a and 3b shows signal waveforms taken from an oscillogram illustrating sampled outputs.
Figure 3B:
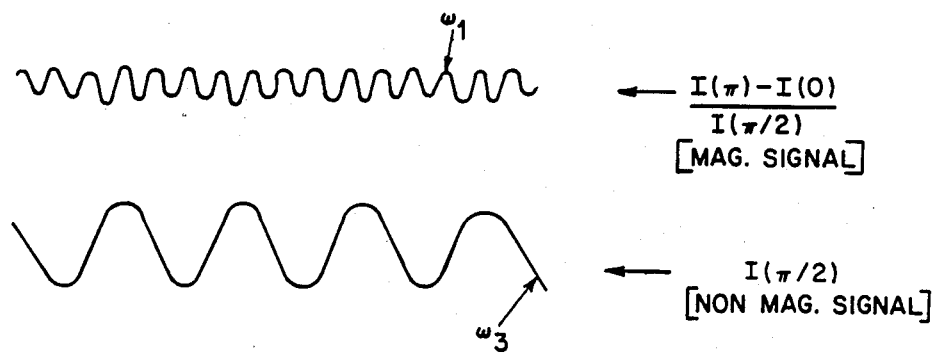

The passive stabilization scheme using sampling technique was implemented in a fiber optic magnetometer as shown in FIG. 1. The fiber sensor configuration was a standard Mach Zehnder fiber interferometer using magnetostrictive metallic glass as the sensing material of element 66. A Michaelson interferometer can be used in lieu of the Mach-Zehnder interferometer. Both are two-arm interferometers. The fiber sensor length was 40 cm. Magnetostrictive element 66 was excited by a sinusoidal MAG drive (upper trace of FIG. 2) at 2 kHZ, and the corresponding interferometer output response showing a peak phase shift, $A_2$, of ~2 $\pi$ radians was obtained (middle trace of FIG. 2). It should be pointed out that the peak phase shift of 2 $\pi$ radian was chosen so that sampling pulses at wt = 0, $\pi/2$, $\pi$ can be shown clearly (lower trace of FIG. 2). A special feature of this sampling demodulation scheme is its ability to be used in the presence of arbitrarily large $2\omega$ phase shifts. The interferometer output was sampled using three separate gated integrators (46, 48, 50). As required by eqs. (5-7), the three samples should be taken by setting the gates of the gated integrators at (i) the "peak" of the sinusoidal drive ($\omega t=0$), (ii) the "valley" of the sinusoidal drive ($\omega t=\pi$), and (iii) the mid-point between the "peak" and the "valley" ($\omega t=\pi/2$). The sampled output at $\omega t=0$ was substracted electronically from that at $\omega t=\pi$ and the differential output was electronically divided by the sampled output at $\omega t=\pi/2$. To demonstrate this passive demodulation scheme, a simulated spurious signal at 2 Hz ($\omega_3$ shown in FIG. 3b) was introduced using a PZT (pizeoelectric element) (not shown) in addition to the desired magnetic signal at 8 Hz ($\omega_1$ shown in FIG. 3b). The PZT was used to apply simulated spurious signal to reference arm 18. The sampled outputs $[I_o/I_i(\omega t=\pi)I_o/I_i(\omega t=o)$ and $I_o/I_i(\omega t=\pi/2)]$ are shown in FIG. 3. It clearly showed that $[I_o/I_i(\omega t=\pi)-I_o/I_i(\omega t=0)]$ was composed of the 8 Hz magnetic signal and the 2 Hz PZT signal, while the $I_o/I_i(\omega t=\pi/2)$ contained the 2 Hz PZT signal only. With signal normalization, the normalized output F (eq. 12) contained only the 8 Hz magnetic signal as shown in FIG., 3b. To ensure proper normalization, the 2 kHz magnetic dither amplitude, h, should be adjusted such that $h=\sqrt{[4N+1]\pi/(2kCl)}$. Comparing FIG. 3 with FIG. 3b the removal of the PZT (noise) signal or the extraction of the magnetic signal $\omega_1$ from the noise-modulated signal has demonstrated the feasibility of passive stabilization using this sampling technique.

The sampling circuits together with the difference and divider circuits combine with the nonlinear fiber optic interferometric sensor containing a nonlinear sensing transducer, to remove spurious modulation from the sensor output signal. Proper adjustment of the drive signal amplitude applied to the sensor's transducer can result in full cancellation of the spurious modulation from the output signal. The drive signal triggers the sampling circuits at proper times in the drive signal oscillations, to obtain the desired results. Should the drive signal not be adjusted exactly the cancellation that occurs will be partial rather than total. The difference and divider circuits together remove spurious modulation from the sampled sensor output signal with the end result that the signal provides an accurate measurement of a field signal processed initially by the sensor then passively stabilized by the sampling, differencing, and dividing circuits.

A new passive stabilization or demodulation scheme as described above requires no special optical or electrooptical component (i.e. 3×3 fiber coupler) (i.e., just using 2×2 fiber coupler) is possible by using a synchronous sample technique. This passive demodulation scheme using synchronous sampling is particularly suited for nonlinear fiber sensors where a test (i.e. measurand) signal X at frequency $\omega_1$ is detected by mixing it with a known carrier signal Y at a frequency $\omega_2$ so that signal X appears as side-band signals at frequencies ($\omega_2\pm\omega_1$). A nonlinear sensor translates the low frequency signal at $\omega_1$ higher frequency signals at $\omega_2\pm\omega_1$ such that electronic processing with high fidelity can be used. In addition, the presence of a fixed carrier signal provides easy access to synchronous sampling of the interferometer output relative to the carrier signal. Through proper samplings at specific time allocations of the carrier signal, two outputs can be obtained: (i) one output is dependent only on the spurious signal free of measurand signal and (ii) another output is dependent on a measurand signal modulated by the spurious signal. With these two signals, one can use post-detection electronic normalization to extract the measurand signal in spite of large spurious signals.

The detection scheme provides an all-optical sensor design and at the same time the high resolution and provides a large dynamic range from the synchronous sampling technique.

Interferometric sensors are inherently nonlinear devices but can be operated as linear devices through phase lock-in techniques that are well known. The interferometer shown in FIG. 1 is truly a nonlinear device because no "lock-in" is performed on the device. Consequently, there is a need to stabilize (actively or passively) the FIG. 1 interferometer. With "lock-in" in FIG. 1 interferometer is so sensitive to environmental perturbations that direct measurements can not be done within the frequency band of these noise perturbations. Therefore, a nonlinear transducer is required to overcome this limitation.

The interferometric process is very sensitive to environmental perturbations, which may be nonmagnetic (i.e. acoustic, thermal) or magnetic. The disclosed system removes nonmagnetic noise produced by these perturbations, but obviously does not remove magnetic noise which can not be distinguished from a true magnetic signal or magnetic field.

The above described interferometric system allows field measurements, and only the field measurements, to be taken at frequencies in an otherwise unavailable frequency band, by translating such frequencies out of the band to a higher frequency band, by using a nonlinear transducer.

The sampling, subtraction, and divider means produce a measurand signal that can be actively fed back to the sensor if both passive and active stabilization is desired.

Only ordinary optical components such as 2×2 fiber couplers are used so that this scheme can be used in any fiber interferometric sensor. This scheme is particularly suited for non-linear sensors such as the fiber magnetostrictive sensor. DC or low-frequency magnetic fields can be measured with potentially high sensitivity and large dynamic range. Linear response with high stability to magnetic field can be achieved by using magnetic nulling. The passive stabilization is achieved through normalization. The normalized output is not affected by the change of fringe visibility in the interferometer. Thus high "optical stability" can be achieved. Time averaging of the sampled signal can be employed to increase the signal to noise ratio.

The invention has been described with reference to a particular system, shown in FIG. 1, however, numerous modifications to the system can be made without departure from the teachings and scope of the invention. For example, one of the two detector 26, 30 can be eliminated, inasmuch as the 2×2 fiber coupler 22 will still yield phase modulated radiation to the single remaining detector and this detector will forward a resultant signal via differential amplifier 36 to the sampling circuitry in the manner previously described, and the system 10 will still implement the sampling, differencing, and dividing scheme earlier described.

Although the invention has been described in terms of a system utilizing three sampling circuits there is no need to limit the practice of the invention to the use of exactly three circuits since the desired results may be achieved by using more, or less, sampling circuits. One possibility is to use six sampling circuits to combine six signal samples into three composite signals with each such signal combining two samples taken at the same instant in time in two successive or consecutive drive signal oscillations. Another possibility is use of one or two sampling circuits combined with a signal storage circuit in such a way that three signal samples are taken at proper times in the drive signal oscillations and are processed in a manner similar to the manner described, but with appropriate modification of the circuitry using the sampled signals.

The invention has been described in terms of a system that is entirely a passively stabilized system. However, the invention can obviously be used in a hybrid system that is both passively and actively stabilized where the active stabilization is in addition to the passive stabilization, and does not alter in any way the technique achieving the passive stabilization. For example, improved measurement of the measurand field can be obtained by an additional active feedback of the demodulated signal to null the system response. Accordingly, such hybrid system are contemplated by the invention and are regarded as active stabilization systems too.

Obviously many modifications and variations of the invention are possible in light of the above teachings. It is therefore to be understood that within the scope of the appended claim the invention may be practiced otherwise than as specifically described.

What is claimed and desired to be secured by letters patent of the United States is:

1. A nonlinear sensor system adapted to produce a relatively noise-free modulated signal despite large noise signals introduced into the system, comprising:
   a two-arm nonlinear interferometric sensor, the sensor having a reference arm and a sensing arm;
   a transducer in the sensing arm;
   a drive source driving the transducer with an oscillation drive signal in the presence of noise signals to cause the sensor to form a sensor output signal comprised of a carrier signal mixed with a noise signal;
   sampling means connected to the output of the sensor to receive the sensor output signal during repeated oscillations of the drive signal, to sample the sensor output signal when the drive signal amplitude is at a peak, is at a valley, and is at a midpoint between peak and valley;
   subtraction means connected to the output of the sampling means to receive from the sampling means two output signals representing the sensor output signal when the drive signal amplitude is at a valley and is at a peak, and to output a difference signal that is a measurand signal modulated by noise signals; and
   divider means connected to the sampling means and to the subtraction means to receive from the sampling means an output signal when the drive signal is at a midpoint, to receive the difference signal from the subtraction means and to produce an output signal that is a measurand signal not modulated by noise signals, despite the noise signals that were introduced into the sensor.

2. The system set forth in claim 1 wherein the transducer includes a magnetostrictive element in the sensing arm.

3. The system set forth in claim 1 wherein the sampling circuitry includes three gated integrators (GI) triggered by a signal from the drive source at selected times in oscillations of a drive signal.

4. The system set forth in claim 1 wherein the interferometric sensor has optical fiber arms.

5. The system set forth in claim 5 wherein said reference arm and said sensing arm connect a 2×2 optical fiber coupler to another 2×2 optical fiber coupler.

6. The system set forth in claim 1 wherein the drive source includes a sine wave generator producing the oscillation drive signal and wherein an electromagnetic coil in the vicinity of the transducer is energized by the generator.

7. A passively stabilized system comprising:
   a coherent radiation source, two interferometric arms in an interferometer, a transducer connected to one of the arms, two 2×2 optical fiber couplers, and two radiation detectors, the radiation source being connected via one of the fiber couplers to the two arms, and the two arms being connected via another one of the fiber couplers to the two detectors;
   a drive signal source connected to the transducer to produce a drive signal transduced by the inerferometer into phase modulated radiation supplied to the two detectors;
   a differential amplifier connected to the two detectors to produce an output signal in response to an output signals from the two detectors;
   three sampling means connected to the output of the differential amplifier to receive the output signal from the differential amplifier, these means being triggered by a drive signal from the drive signal source to sample the output signal from the differential amplifier at selected times;
   difference means connected to the outputs of two of the three sampling means to receive two samples of the output signal from the differential amplifier and to output a difference signal carrying noise-induced modulation from the two samples; and
   divider means connected to the output of one of the sampling means and connected to the difference means to receive a sample of the output signal from the differential amplifier and to receive the difference signal from the difference circuit to produce a passively stabilized output signal liberated from noise-induced modulation.

8. The system set forth in claim 7 wherein the three sampling circuits are comprised of three gated integrators.

9. The system set forth in claim 7 wherein the transducer includes a magnetostrictive element.

10. The system set forth in claim 7 wherein the drive source includes a sine wave generator and an electromagnetic coil, the coil being located near the transducer to produce a magnetic drive signal for the transducer.

11. A method for producing a modulated signal devoid of noise induced modulation despite large noise signals sensed by a transducer in a nonlinear sensor system, comprising the steps of:
   using a nonlinear interferometric sensor having a transducer in an interferometer sensing arm to sense a signal in the presence of noise signals and to transduce the signal into phase modulated radiation through interferometric action;
   using a drive source to apply a sinusoidal drive signal to the transducer to introduce a carrier signal into the sensor while noise signals are transduced into the sensor so that a sensor output signal that has a noise signal component imposed on a measurand signal is produced;

sampling the sensor output signal only when the drive signal amplitude is at peak, at valley, and at midpoint between peak and valley during drive signal oscillations in which each oscillation includes a peak, a midpoint, and a valley;

taking the samples of the sensor output signal that were taken when the drive signal amplitude was at valley and was at peak and obtaining a difference signal through subtraction of the samples to thus obtain a noise laden signal; and dividing the sample of the sensor output signal that was taken when the drive signal amplitude was at midpoint into the noise laden signal to obtain a measurand signal unburdened by a noise induced signal component.

12. A technique for removing spurious modulation from an intended signal to passively stabilize an output signal from a nonlinear sensor to reduce spurious modulation from said output signal, comprising the steps of:

triggering gated integrators to sample the output signal at times $t=0$, $\pi/\omega$, and $\pi/2\omega$ during an oscillation signal applied to the sensor to obtain samples of the output signal;

subtracting the samples of the output signal taken when time $t=\pi/\omega$ and when time $t=0$ to obtain a difference signal; and dividing the difference signal by the sample of the output signal taken at time $t=\pi/2\omega$ to produce a passively stabilized output signal.

13. The technique as set forth in claim 12 wherein three gated integrators are used to take the three samples.

14. The technique as set forth in claim 13 wherein a sine wave generator is used to trigger the gated integrators.

15. The technique as set forth in claim 14 wherein the gated integrators are triggered by a drive signal from a sinusoidal drive source producing a peak signal at time $t=0$, a valley signal at time $t=\pi/\omega$, and a midpoint signal at time $t=\pi/2\omega$.

16. The technique as set forth in claim 12 wherein a fiber optic interferometer is used as the nonlinear sensor.

17. The technique as set forth in claim 12 wherein a sine wave generator and an electromagnetic coil are used to introduce an intended signal into the sensor via a magnetostrictive element sensitive to an electromagnetic field created by the generator and the coil.

* * * * *